United States Patent
Le et al.

(10) Patent No.: US 7,869,516 B2
(45) Date of Patent: Jan. 11, 2011

(54) MOTION ESTIMATION USING BIT-WISE BLOCK COMPARISONS FOR VIDEO COMPRESSSION

(75) Inventors: Ruby B. Le, Princeton, NJ (US); Dale Morris, Steamboat Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2004 days.

(21) Appl. No.: 10/403,864

(22) Filed: Mar. 31, 2003
(Under 37 CFR 1.47)

(65) Prior Publication Data

US 2004/0190619 A1 Sep. 30, 2004

(51) Int. Cl.
*H04N 7/12* (2006.01)
*H04N 11/02* (2006.01)

(52) U.S. Cl. .............................. 375/240.16; 375/240.26

(58) Field of Classification Search .... 375/240.1–240.3
See application file for complete search history.

(56) References Cited

U.S. PATENT DOCUMENTS

| | | | | |
|---|---|---|---|---|
| 6,192,148 B1 * | 2/2001 | Lin | ............................ | 382/166 |
| 7,020,201 B2 * | 3/2006 | Luo et al. | .............. | 375/240.16 |
| 7,110,456 B2 * | 9/2006 | Sekiguchi et al. | ...... | 375/240.16 |
| 7,110,459 B2 * | 9/2006 | Srinivasan | ............. | 375/240.29 |
| 7,224,731 B2 * | 5/2007 | Mehrotra | ............... | 375/240.16 |
| 2005/0254722 A1 * | 11/2005 | Fattal et al. | ................. | 382/274 |

* cited by examiner

*Primary Examiner*—David Czekaj

(57) ABSTRACT

Motion estimation uses tally (Population Count) and XOR (or other bit-wise comparison) operations to obtain a block-match measure for reference and predicted blocks to identify motion vectors for use in video compression. The XOR operations can be performed on absolute or relative luminance data. For example, a one-bit-per-pixel representation of a block can indicate for each pixel its luminance relative to a local average luminance. The performance improvement offered by the invention (relative to methods using the absolute value of the differences of absolute luminance values) can more than offset a penalty in block-match accuracy due to loss of information in luminance data reduction and/or the ignoring of bit significance due to the bit-wise comparison.

11 Claims, 1 Drawing Sheet

MOTION ESTIMATION USING BIT-WISE BLOCK COMPARISONS FOR VIDEO COMPRESSSION

BACKGROUND OF THE INVENTION

The present invention relates to digital-image processing and, more particularly, to evaluating matches between digital images. The invention provides for high throughput motion estimation for video compression by providing a high-speed image-block-match function.

Video (especially with, but also without, audio) can be an engaging and effective form of communication. Video is typically stored as a series of still images referred to as "frames". Motion and other forms of change can be represented as small changes from frame to frame as the frames are presented in rapid succession. Video can be analog or digital, with the trend being toward digital due to the increase in digital processing capability and the resistance of digital information to degradation as it is communicated.

Digital video can require huge amounts of data for storage and bandwidth for communication. For example, a digital image is typically described as an array of color dots, i.e., picture elements ("pixels"), each with an associated "color" or intensity represented numerically. The number of pixels in an image can vary from hundreds to millions and beyond, with each pixel being able to assume any one of a range of values. The number of values available for characterizing a video pixel can range from two to trillions; in the binary code used by computers and computer networks, the typical range is from eight to thirty-two bits.

In view of the typically small changes from frame to frame, there is a lot of redundancy in video data. Accordingly, many video compression schemes seek to compress video data in part by exploiting inter-frame redundancy to reduce storage and bandwidth requirements. For example, two successive frames typically have some corresponding pixel ("picture-element") positions at which there is change and some pixel positions in which there is no change. Instead of describing the entire second frame pixel by pixel, only the changed pixels need be described in detail—the pixels that are unchanged can simply be indicated as "unchanged". More generally, there may be slight changes in background pixels from frame to frame; these changes can be efficiently encoded as changes from the first frame as opposed to absolute values. Typically, this "inter-frame compression" results in a considerable reduction in the amount of data required to represent video images.

On the other hand, identifying unchanged pixel positions does not provide optimal compression in many situations. For example, consider the case where a video camera is panned one pixel to the left while videoing a static scene so that the scene appears (to the person viewing the video) to move one pixel to the right. Even though two successive frames will look very similar, the correspondence on a position-by-position basis may not be high. A similar problem arises as a large object moves against a static background: the redundancy associated with the background can be reduced on a position-by-position basis, but the redundancy of the object as it moves is not exploited.

Some prevalent compression schemes, e.g., MPEG, encode "motion vectors" to address inter-frame motion. A motion vector can be used to map one block of pixel positions in a first "reference" frame to a second block of pixel positions (displaced from the first set) in a second "predicted" frame. Thus, a block of pixels in the predicted frame can be described in terms of its differences from a block in the reference frame identified by the motion vector. For example, the motion vector can be used to indicate the pixels in a given block of the predicted frame are being compared to pixels in a block one pixel up and two to the left in the reference frame. The effectiveness of compression schemes that use motion estimation is well established; in fact, the popular DVD ("digital versatile disk") compression scheme (a form of MPEG2) uses motion detection to put hours of high-quality video on a 5-inch disk.

Identifying motion vectors can be a challenge. Translating a human visual ability for identifying motion into an algorithm that can be used on a computer is problematic, especially when the identification must be performed in real time (or at least at high speeds). Computers typically identify motion vectors by comparing blocks of pixels across frames. For example, each 16×16-pixel block in a "predicted" frame can be compared with many such blocks in another "reference" frame to find a best match. Blocks can be matched by calculating the sum of the absolute values of the differences of the pixel values at corresponding pixel positions within the respective blocks. The pair of blocks with the lowest sum represents the best match, the difference in positions of the best-matched blocks determine the motion vector. Note that in some contexts, the 16×16-pixel blocks typically used for motion detection are referred to as "macroblocks" to distinguish them from 8×8-pixel blocks used by DCT (discrete cosine transformations) transformations for intra-frame compression.

For example, consider two color video frames in which luminance (brightness) and chrominance (hue) are separately encoded. In such cases, motion estimation is typically performed using only the luminance data. Typically, 8-bits are used to distinguish 256 levels of luminance. In such a case, a 64-bit register can store luminance data for eight of the 256 pixels of a 16×16 block; thirty-two 64-bit registers are required to represent a full 16×16-pixel block, and a pair of such blocks fills sixty-four 64-bit registers. Pairs of 64-bit values can be compared using parallel subword operations; for example, PSAD "parallel sum of the absolute differences" yields a single 16-bit value for each pair of 64-bit operands. There are thirty-two such results, which can be added or accumulated, e.g., using ADD or accumulate instructions. In all, about sixty-four instructions, other than load instructions, are required to evaluate each pair of blocks.

Note that the two-instruction loop (PSAD+ADD) can be replaced by a one-instruction loop using a parallel sum of the absolute differences and accumulate PSADAC instruction. However, this instruction requires three operands (the minuend register, the subtrahend register, and the accumulate register holding the previously accumulated value). Three operand registers are not normally available in general-purpose processors. However, such instructions can be advantageous for application-specific designs.

The Intel Itanium processor provides for improved performance in motion estimation using one- and two-operand instructions. In this case, a three-instruction loop is used. The first instruction is a PAveSub, which yields half the difference between respective one-byte subwords of two 64-bit registers. The half is obtained by shifting right one bit position. Without the shift, nine bits would be required to express all possible differences between 8-bit values. So the shift allows results to fit within the same one-byte subword positions as the one-byte subword operands.

These half-differences are accumulated into two-byte subwords. Since eight half-differences are accumulated into four two-byte subwords, the bytes at even-numbered byte positions are accumulated separately from bytes at odd-numbered byte positions. Thus, a "parallel accumulate magnitude left" PAccMagL accumulates half-differences at byte positions 1, 3, 5, and 7, while a "parallel accumulate magnitude right" PAccMagR accumulates the half-differences at byte positions 0, 2, 4, and 6. This loop can execute more quickly than the two-instruction loop described above, as a final sum is not calculated within each loop iteration. Instead, the four 2-byte subwords are summed once after the loop iterations end.

The four two-byte subwords can be summed outside the loop using an instruction sequence as follows. First, the final result is shifted to the right thirty-two bits. Then the original and shifted versions of the final result are summed. Then the sum is shifted sixteen bits to the right. The original and shifted versions of the sum are added. If necessary, all but the least-significant sixteen bits can be masked out to yield the desired match measure.

While the foregoing programs for calculating match measures are quite efficient, further improvements in performance are highly desirable. The number of matches to be evaluated varies by orders of magnitude, depending on several factors, but there can easily be millions to evaluate for a pair of frames. In any event, the block matching function severely taxes encoding throughput. Further reductions in the processing burden imposed by motion estimation are desired.

SUMMARY OF THE INVENTION

The present invention provides a video motion estimation method in which luminance values are extracted from reference and predicted video frames, reference and predicted luminance values are compared bit-wise (e.g., by XORing them), a match measure is generated as a function of the comparison results, and a motion vector is determined as a function of the match measures. A predicted block of the predicted frame is compared with multiple reference blocks of the reference frame. In general, the best-matching reference block (as determined by the inventive method) determines a motion vector to be used in encoding the predicted block.

The results of the bit-wise comparison are used in generating a match measure. If the bit-wise comparison involves one or more XOR operations, then tallying the number of 1s in the XOR results can provide a match measure: the lowest tally corresponds to the best match. Of course, 0s can be counted instead; in that case, the highest tally corresponds to the best match. Other methods of generating a match measure can be used depending on the specific operation used for bit-wise comparison.

A motion vector is determined by the match measure. Typically, the motion vector can be determined by the relative positions of the best-matching reference block and the predicted block. For example, if the predicted block is two pixels to the right and four pixels down relative to the corresponding position of the best-matching reference block, then the motion vector is two pixels to the right and four pixels down.

The invention provides for bit-wise comparison of absolute luminance values. Herein, an "absolute" luminance value is one that determines luminance without reference to other luminance values. In one prior art approach described in the background section above, a block-match measure is calculated as the sum of the absolute value of differences between absolute luminance values. The potential performance advantage provided by the invention is clear, as bit wise operations such as XOR can be performed (generally) faster than non-bit-wise operations such as subtraction (which incurs carry latencies). Also, the invention does not require computation of an absolute value. Finally, tallying is simpler than addition.

On the other hand, since bit-wise comparisons ignore significance, they lose information that is preserved when subtraction is used for comparison. As a result, in general, the reference block identified in accordance with the present invention as the best match is less likely to actually be the best match than the reference block so identified by the prior art. As a result, compression effectiveness (a combined measure of extent of compression and image quality) can suffer. However, in some cases, the impact on compression effectiveness can be more than offset by the performance gains.

Furthermore, the performance gains provided by the present invention can be used to improve block-match accuracy. For example, where there is only a limited amount of time to perform block matching, the invention may result in finding a better match than would have been identified by the prior art. This is so because the inventive method is faster, and therefore more candidate blocks can be compared within the time limit; if the best match would not have been found within the time limit by the prior art, but could be found within the time limit by the inventive approach, the inventive approach may yield a better match. For example, if the prior art method would allow the checking of all reference blocks within 2 pixels of a predicted block within some time limit, and the inventive method would allow the checking of all blocks within 3 pixels of the predicated block within the same time limit, and if the best match happened to be 3 pixels away, the inventive method could yield a better match, and hence greater compression effectiveness.

The invention further provides for bit-wise comparison of relative luminance values. For example, the luminance value associated with a pixel can be taken relative to the average luminance for the incorporating reference or predicted block. Expressing a block in terms of luminance relative to an average can preserve pattern information useful for image matching even when the number of bits representing each relative-luminance pixel is small. Thus, the number of bits per pixel can be reduced, for example, from eight to four, two, or even one.

Using reduced-bit-depth relative luminance values has two advantages. First, more pixels can be processed per word of data. For example, instead of representing eight 8-bit pixels per 64-bit word, sixty-four 1-bit pixels can be represented per word. This corresponds to an eightfold increase in the image-processing rate.

Second, the penalty in compression effectiveness associated with the use of a bit-wise comparison (relative to a comparison that takes significance into account) is reduced. For example, there is no penalty in using an XOR comparison instead of the absolute value of differences when only one bit is used to represent each pixel.

A computer program embodying the invention can incorporate an instruction implementing the bit-wise comparison. For example, an XOR instruction can be used. Alternatively, the instruction implementing a bit-wise comparison can also implement other operations. For example, an XOR-PopCount instruction yields a count of the number of one's resulting from the XORing of two sets of pixel values. Furthermore, an XOR-PopCount-Accumulate instruction can be used to accumulate counts when (as is usually the case) more than one iteration of a comparison instruction is required to compared two blocks.

The invention also provides for parallel subword combined instructions. For example, a parallel-XOR-PopCount instruction can provide four 16-bit counts in four 16-bit subwords of a 64-bit result register. Likewise, a parallel-XOR-PopCount-Accumulate instruction can accumulate four 16-bit values. Since the bit-wise comparison is typically iterated, computing values on a subword basis reduces the amount of processing required per loop, postponing the final accumulation for a single instruction that is not iterated. This further improves throughput.

The present invention provides a substantial throughput improvement over prior-art motion estimation methods. Preferred embodiments of the invention more than double throughput with at most negligible penalty in compression effectiveness. These and other features and advantages of the invention are apparent from the description below with reference to the following drawings.

DETAILED DESCRIPTION

Figure 1:
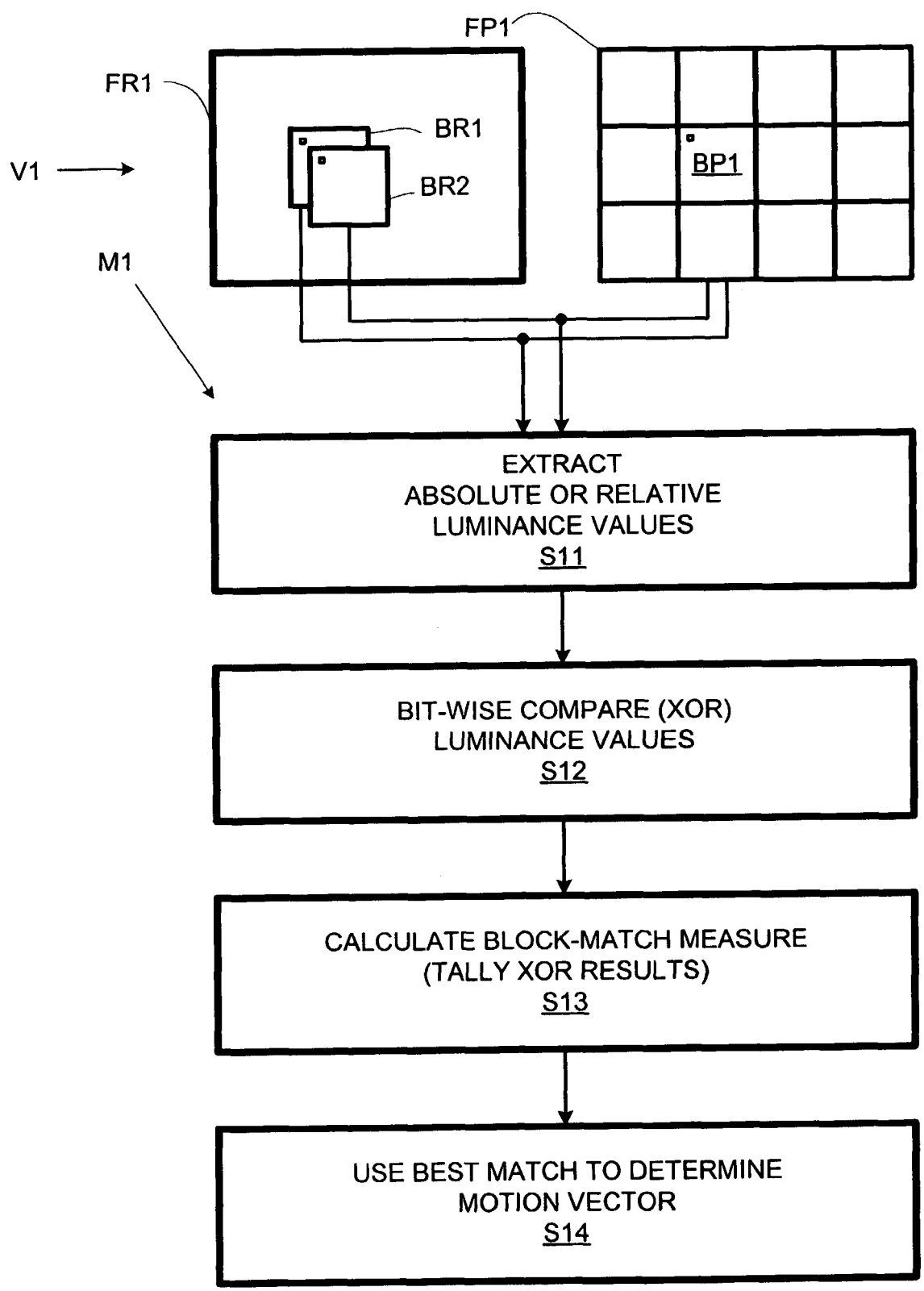
FIG. 1 is a flow-chart of a generalized method in accordance with the present invention.

In accordance with the present invention and as flow-charted in FIG. 1, a motion-estimation method M1 associates a motion vector with a predicted block of a predicted frame as follows. A predicted frame FP1 is to be encoded in terms of its differences from a reference block FR1 on a block-by-block basis. To this end, predicted frame FP1 is divided into "predicted" blocks such as block BP1, while "reference" blocks are defined for reference frame FR1 on a 1-pixel-position pitch in both the vertical and horizontal dimensions.

Each predicted block is compared to the reference block at the corresponding frame position. For example, predicted block BP1 is compared to reference block BR1 on a pixel-by-pixel basis. In addition predicted block BP1 is compared to other reference blocks, e.g., BR2, within some range of pixel positions of block BR1. This range is typically a selectable parameter and can involve as few as several blocks in the vicinity of the same-position reference block BR1 or as many as all the reference blocks in the reference frame. For expository purposes, frames FP1 and FP2 are shown as twelve blocks in area; typically, the number of blocks per frame is much greater.

In a step S11, luminance data is extracted from the predicted frame and a reference frame. Raw video data is presented in a color space, usually, a red-green-blue (RGB) color space, with two or more (typically eight) bits per component (R,G,B) assigned to each pixel of each frame. As the human eye is more sensitive to green than to blue or red, the green values can be used as luminance data. Accordingly, the process of extracting luminance data can be as simple as selecting the original green values for each pixel.

Preferably, however, the extraction can involve conversion to relative values and bit-length reduction. The bit-length reduction reduces the amount of data that must be manipulated to identify a motion vector, while the conversion to relative values preserves pattern information that otherwise might be lost in bit-length reduction, thus maintaining the validity of the block-match measurements.

Step S12 involves bit-wise comparison of block data. Specifically, each block comparison is performed pixel-by-pixel. In other words, each pixel of the predicted block being compared is compared with the pixel at the corresponding position of the reference frame involved in the comparison. The term "bit-wise" herein includes operations for which each bit of the result is determined solely by one bit from each of the (typically two) operands. For example, XOR and XNOR are bit-wise comparison operations. Subtraction (as applied to multi-bit operands) is a counter example, since each result bit is determined not exclusively by respective bits of the subtrahend and minuend, but also by a carry (or borrow) value. (On the other hand, there is bit-wise subtraction that yields: 01 when the minuend is 1 and the subtrahend is 0; 10 when the minuend is 0 and the subtrahend is 1; and yields 00 when the minuend and subtrahend are equal; in this case, there is no carrying, but the result is twice as long as the operands.)

At step S13, a block-match value is calculated from the results of the bit-wise comparison. Where XOR is the bit-wise operation, then the number of 1s in the result can be tallied across all pixel positions of a block to provide a block-match measure. In this case, the lower the tally, the better the match. Alternatively, the number of zeroes can be counted, with a greater number indicating a better match. If the comparison operation is XNOR, more ones indicates a better match.

At step S14, a motion vector is assigned to the predicted block. The motion vector is typically determined by the best-matching reference block. The motion vector can be identified as a displacement in pixels horizontally and vertically of the reference block position from the predicted block position; for example, if the best-matching reference block has the same position relative to the reference frame that the predicted block has with respect to the predicted frame, the motion vector is 0,0. Various strategies for selecting among equally matched reference frames can be accommodated, as the choice should not significantly impact compression effectiveness.

Method M1 can be implemented as a computer program on a computer in a variety of ways. If an entire block can be represented in a processor register, then one XOR instruction followed by a tally (population count) instruction can provide a block-match measure for a given pair of blocks. The invention further provides for an XORPopCount instruction that performs both an XOR operation and a tally so that steps S12 and S13 can be performed in one instruction per block.

Typically, more than one register is required to represent the luminance data in a block. If n registers are required to represent the luminance data for a block, then n XOR instructions can be used to implement the comparison, n tally instructions can be performed on the XOR results, and n addition or accumulate instructions can be used to combine the tallies to provide the block match measure. Alternatively, n combined XORPopCount instructions can be used instead of separate XOR and PopCount instructions to reduce the number of instructions required to obtain a block-match measure.

The invention further provides for an XOR-PopCount-Accumulate instruction so that a block-match measure can be obtained using only as many instructions as are required to store one block of luminance data. However, this instruction requires that three operand registers be read-luminance data for the predicted block, luminance data from the reference block, and any previously accumulated tally data. General-purpose processors do not, in general, provide for three-read ports into a general register file, so this instruction is implemented on a processor dedicated to video processing.

Another way to combine the XOR and tally operations is to perform the tallying on a subword basis. For example, assume 64-bit registers are used. Then the result of the XOR operation can be a 64-bit word. Instead of tallying all instances of "1" across all sixty-four bits, four tallies can be conducted across four 16-bit subword segments of the register using an XOR-PopCount2 instruction (where the "2" indicates subwords that are 2-bytes long). The four tallies can be accumulated in parallel using an Add2 instruction. After n iterations of the XOR-PopCount2 and Add2 loop, four accumulated tallies remain. These can be combined in a conventional manner by shifting and adding the four values. Preferably, however, a TreeAdd2 instruction can be used to provide the sum of the four two-byte subwords directly.

EXAMPLE 1

The blocks are 4×4 pixels, with absolute luminance data being 4-bits per pixel. The luminance data for a reference block and a predicted block is loaded into registers, with one register sufficing to store all the luminance data for a block. An XORPopCount instruction specifying the two registers as operands is executed and the result is stored in a result register. This result serves as the block-match measure to be compared with other block-match measures to determine a best match and, thus, a motion vector.

EXAMPLE 2

The blocks are 16×16 pixels, with absolute luminance data being 8-bits per pixel. Thirty-two 64-bit registers are required to represent the luminance data for a block. Thus, 32 iterations of an XOR-plus-PopCount-plus-Accumulate loop can be used to provide a block-match measure. Preferably, a single XOR-PopCount instruction combines the XOR and PopCount operations.

EXAMPLE 3

As in Examiner 2, the blocks are 16×16 with luminance data being 8-bits per pixel. In this case, step S11 of extracting luminance values involves computing an average luminance value for each block. To this end, the luminance values for sixteen collectively well-distributed pixels are averaged. Each block pixel is assigned a 2-bit value: 00 if its luminance value is equal to the rounded average, a 01 is it is greater than the average, and a 10 if it is less than the average. Note that while two bits are used to represent the luminance of each pixel, the actual pixel depth is between one and two as the value 11 is not used.

Eight 64-bit registers are required to represent each block. Eight iterations of a loop including an XOR-PopCount instruction are used to obtain the match measure. The XOR instruction yields a 00 when the relative pixel values are equal, 01 or 10 when one is zero and the other is not, and an 11 when one relative pixel value is negative and the other is positive. The PopCount instruction assigns a zero to pixel positions with equal relative luminance values, a one to small differences (regardless of the direction of the difference), and a two to large differences (again, regardless of the direction of the differences). Since direction of a difference is not reflected in the XOR result, there is no need to take an absolute value before the PopCount is performed. Thus, while the XOR and PopCount instructions ignore bit-significance, no information is lost in this example relative to using a sum of the absolute values of the differences of the two-bit values.

EXAMPLE 4

Using 16×16×8 blocks again, each pixel is assigned a one-bit value indicating whether its luminance is less than or greater than or equal to a local average luminance. For each pixel, the relevant local average is the average luminance of sixteen pixels evenly distributed throughout a 16×16 block having the target pixel at or near its center so that the same average is applied to pixels of the same 4×4-pixel subblock. Four 64-bit registers are required to represent a block with 1-bit-per-pixel luminance data. In this case, each loop iteration includes an XORPopCount2 instruction and an Add2 instruction. After eight iterations, a TreeAdd2 instruction is used to obtain a block-match measure.

It should be noted that the invention provides for many other variations in motion-estimation methods. For example, the luminance data need not be extracted from the reference frame and predicted frame at the same time; in fact, typically, the reference luminance data is extracted before the predicted luminance data. Furthermore, the steps of method M1 can be pipelined so that, for example, one block is being compared while luminance data is being extracted from another block of the same or a different frame.

The video data to which the invention is applied need not be raw video data; the invention can be applied to compressed video data to be transcoded to another compressed format. For example, the source video data can be in DV tape format to be transcoded to MPEG2. In this and other cases, the color space can be other than an RGB space. For example, the color space can separate luminance from chrominance. In this case, the absolute luminance data can be provided directly without relying on the assumption that the luminance is accurately represented by "green" data. These and other variations upon and modification to the present invention are with the scope of the invention as defined in the following claims.

What is claimed is:

1. A video motion estimation method comprising:
   a computer extracting luminance data from a predicted frame and a reference frame, said predicted frame including a predicted block of predicted pixels, said reference frame including reference blocks of reference pixels, said luminance data associating reference luminance values with each of said reference pixels and predicted luminance values with each of said predicted pixels;
   said computer bit-wise comparing reference luminance values for each of said reference blocks with respective predicted luminance values;
   said computer generating match measures for each of said reference blocks as a function of the results of said bit-wise comparing; and
   said computer determining a motion vector as a function of said match measures.

2. A video motion estimation method as recited in claim 1 wherein said generating is implemented at least in part by a computer program instruction that also implements at least in part said bit-wise comparing.

3. A video motion estimation method as recited in claim 2 wherein said instruction also implements an operation of counting instances of a value generated by said bit-wise comparing.

4. A video motion estimation method as recited in claim 3 wherein said comparing results in a word stored in a register and said counting yields plural counts of instances of a value generated by said bit-wise comparing in respective subwords of said word.

5. A video motion estimation method as recited in claim 3 wherein said instruction also implements an operation that adds the result of said counting to the results of other countings of the results of other comparings.

6. A video motion estimation method as recited in claim 1 wherein said luminance data expresses absolute luminance values.

7. A video motion estimation method as recited in claim 1 wherein said luminance data expresses relative luminance values.

8. A video motion estimation method as recited in claim 1 wherein said extracting step involves converting absolute luminance values of a first average bit length to relative luminance values of a lesser average bit length.

9. A video motion estimation method as recited in claim 8 wherein said lesser average bit length is less than 2 bits per pixel.

10. A video motion estimation method as recited in claim 9 wherein said lesser average bit length is one bit per pixel.

11. A video motion estimation method as recited in claim 1 wherein said determining involves identifying a best-matching block.

* * * * *

UNITED STATES PATENT AND TRADEMARK OFFICE
CERTIFICATE OF CORRECTION

| | | |
|---|---|---|
| PATENT NO. | : 7,869,516 B2 | Page 1 of 1 |
| APPLICATION NO. | : 10/403864 | |
| DATED | : January 11, 2011 | |
| INVENTOR(S) | : Ruby B. Lee et al. | |

It is certified that error appears in the above-identified patent and that said Letters Patent is hereby corrected as shown below:

On the Title page, in field (54), Title, in column 1, line 3, delete "COMPRESSSION" and insert -- COMPRESSION --, therefor.

On the Title page, in field (75), Inventors, in column 1, line 1, delete "Ruby B. Le" and insert -- Ruby B. Lee --, therefor.

In column 1, line 3, delete "COMPRESSSION" and insert -- COMPRESSION --, therefor.

Signed and Sealed this
Thirteenth Day of September, 2011

David J. Kappos
*Director of the United States Patent and Trademark Office*